(12) United States Patent
May et al.

(10) Patent No.: US 7,696,589 B2
(45) Date of Patent: Apr. 13, 2010

(54) OPTICAL DEVICE

(75) Inventors: Gregory J. May, Corvallis, OR (US); Kuohua Wu, Tucson, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/351,134

(22) Filed: Jan. 9, 2009

(65) Prior Publication Data

US 2009/0122399 A1 May 14, 2009

Related U.S. Application Data

(62) Division of application No. 11/652,850, filed on Jan. 11, 2007, now Pat. No. 7,495,305.

(60) Provisional application No. 60/784,125, filed on Mar. 20, 2006.

(51) Int. Cl.
*H01L 31/0232* (2006.01)

(52) U.S. Cl. .............. 257/432; 257/436; 257/437; 257/466; 257/E31.13; 257/E31.127; 359/454; 359/459

(58) Field of Classification Search ............... 257/432, 257/E31.13, 436, 437, 466, E31.127; 359/454, 359/459

See application file for complete search history.

(56) References Cited

U.S. PATENT DOCUMENTS

| 4,888,260 | A | 12/1989 | Cowan |
| 5,948,199 | A | 9/1999 | McGrew |
| 6,124,912 | A | 9/2000 | Moore |
| 6,468,380 | B1 | 10/2002 | Christuk et al. |
| 7,262,911 | B2 | 8/2007 | Niwa et al. |
| 2005/0190453 | A1 * | 9/2005 | Dobashi ............... 359/619 |
| 2006/0003239 | A1 | 1/2006 | Cooper et al. |

* cited by examiner

*Primary Examiner*—Tu-Tu V Ho

(57) ABSTRACT

Embodiments of an optical device including at least two transparent layers are disclosed.

8 Claims, 2 Drawing Sheets

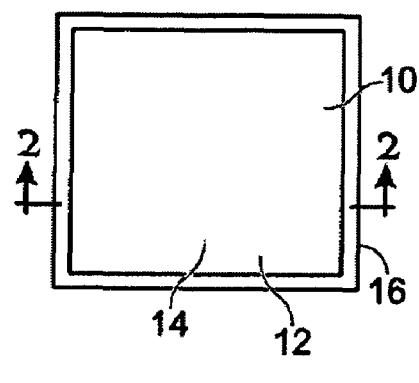
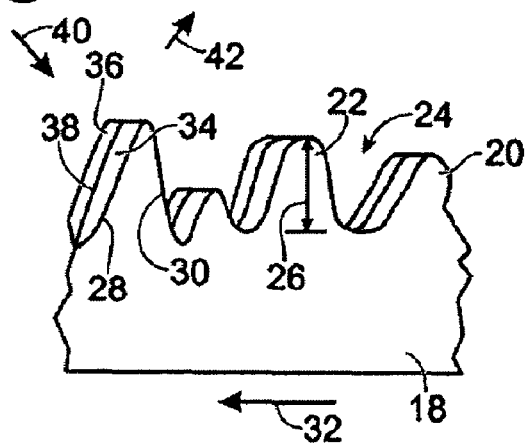
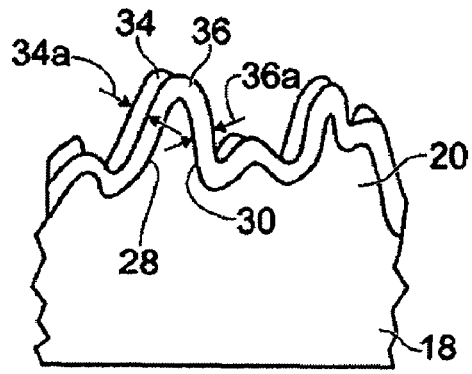
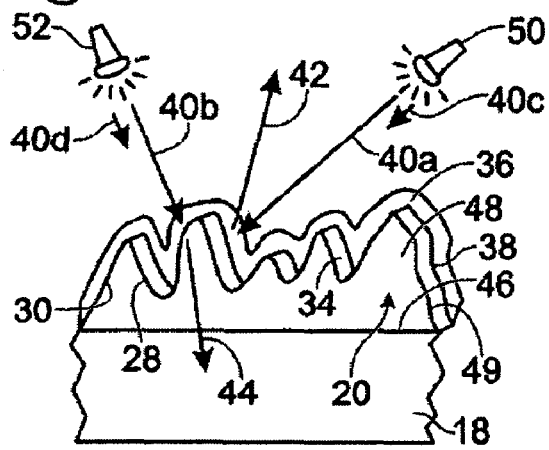
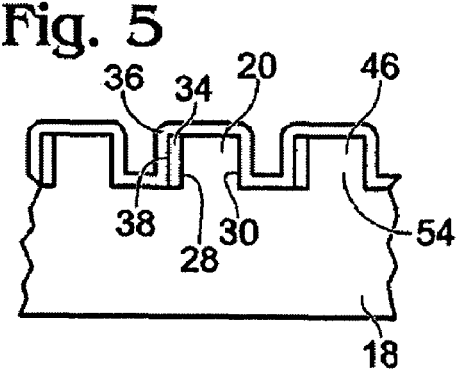
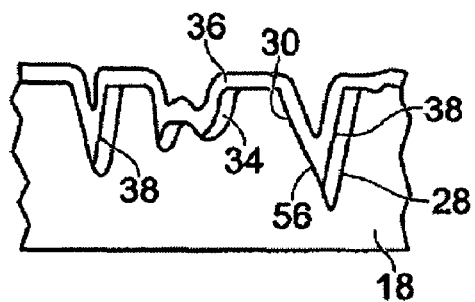

OPTICAL DEVICE

CROSS-REFERENCE TO RELATED APPLICATIONS

This application is a Division of copending U.S. patent application Ser. No. 11/652,850, filed on Jan. 11, 2007, which is incorporated herein by reference.

This application claims priority on U.S. provisional patent application Ser. No. 60/784,125, filed on Mar. 20, 2006, in the name of Thomas E. Novet and Gregory J. May, and entitled SCREEN.

BACKGROUND

In the application of optical devices, such as reflective optical devices, it may be difficult to selectively reflect desirable imaging light.

BRIEF DESCRIPTION OF THE DRAWINGS

FIG. 1 is a front view of one example embodiment of a reflective optical device.

FIG. 2 is a cross-sectional side view of one embodiment of an optical device showing multiple layers of the optical device.

FIG. 3 is a cross-sectional side view of one embodiment of an optical device showing multiple layers of the optical device.

FIG. 4 is a cross-sectional side view of one embodiment of an optical device showing multiple layers of the optical device.

FIG. 5 is a cross-sectional side view of one embodiment of an optical device showing multiple layers of the optical device.

FIG. 6 is a cross-sectional side view of one embodiment of an optical device showing multiple layers of the optical device.

DETAILED DESCRIPTION OF THE DRAWINGS

Figure 7:
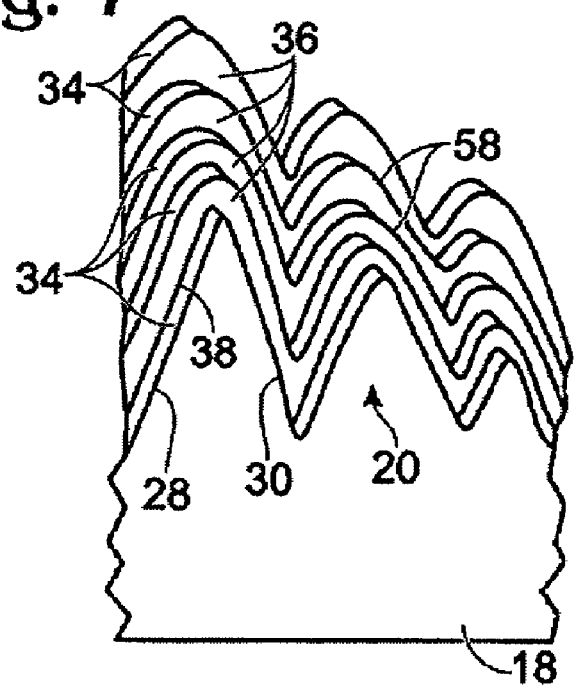
FIG. 7 is a cross-sectional side view of one embodiment of an optical device showing multiple layers of the optical device

The present disclosure provides an apparatus, a method of manufacturing, and a method of using a reflective optical device. The optical device can be utilized in a wide variety of applications, such as optical display devices. For ease of illustration, the present disclosure will be discussed in terms of one embodiment, namely, a projection screen.

FIG. 1 is a top view of one example embodiment of a reflective optical device 10, such as a projection screen 12, including a viewing surface 14 and a frame 16. Frame 16 may support viewing surface 14 and may allow mounting of optical device 10 to a mounting surface, such as a conference room wall (not shown). In other embodiments, projection screen 12 may be free standing and, therefore, may be easily transported and may not require frame 16.

FIG. 2 is a cross-sectional side view of optical device 10 of FIG. 1 taken along line 2-2, showing a base 18 including surface features 20. Surface features 20 may refer to protrusions 22 and/or depressions 24, and may also be referred to as a textured (see FIG. 5) or a non-smooth surface, peaks, valleys, and grooves. The height, slope of sides, profile, and other aspects of the asperities can be varied to provide desired screen characteristics for particular applications. Generally, the dimensions of the asperities may be large relative to the wavelength of visible light to help avoid diffraction and interference effects, while small enough to help avoid pixilation or sparkle. Generally, when the distance from the screen to a viewer is larger, larger asperities can be used without resulting in undesirable pixilation or sparkle. Surface features 20 may or may not be diffractive elements such as a diffraction grating. In other words, in some embodiments surface features 20 may be a diffraction grating and in other embodiments surface features 20 may not be a diffraction grating. Surface features 20 may be an inherent quality of base 18 or base 18 may purposely be manufactured or processed to include surface features 20. In one embodiment surface features 48 may be separately manufactured on base 18. In the embodiment shown, surface features 20 may be random in size, shape and/or location, and may each define a height in a range of about 4 microns to about 500 microns or more, and for example, may have a height 26 toward the smaller range for indoor projection screen applications with closer viewing distances. Other applications such as large billboard screens may use larger surface features 20, larger than 500 microns, where the viewing distances are much greater.

Each of surface features 20 may define, as shown in this cross-sectional view, a first side surface 28 and a second side surface 30. During processing wherein base 18 may be moved in a direction 32, for example, first side surface 28 may be referred to as a downstream surface and second side surface 30 may be referred to as an upstream surface. Base 18 may be a light absorbing material, such as a black, light absorbent material. In another embodiment, base 18 may be transparent and may include an absorbent coating material on an underside thereof.

Still referring to FIG. 2, in the example embodiment shown, first side surface 28 may include a first material 34 positioned thereon, and a second material 36 positioned on first material 34. In this embodiment, first and second materials 34 and 36 are each positioned substantially only on first side surface 28 of surface features 20. The terms "positioned substantially only on the first side surface" may mean that an effective amount of first material 34 is deposited on first side surface 28 to render first side surface 28 reflective of light and any amount of first material 34 that may be deposited on second side surface 30 of surface features 20 will allow second side surface 30 to absorb light.

First material 34 may be a clear or transparent material having a first index of refraction (R1). Second material 36 may be a clear or transparent material having a second index of refraction (R2), wherein the first index of refraction is different from the second index of refraction. Accordingly, when these two materials are deposited or coated on one another they will define an interface 38 that will reflect therefrom a percentage of light impinging on the interface. The material of base 18 may also have a different index of fraction from either or both of the coating materials. The base material may also be transparent, with an absorptive lower surface for example, wherein the first surface interface between the first coating material and the base may also act as a reflecting surface and aid in the overall reflective effect of device 10.

In particular, the amount of reflection at an interface 38 of first side surfaces 28 of surface features 20 may be calculated as $((R1-R2)/(R1+R2))^2$. For a first index of refraction of 1.5 of first material 34 and a second index of refraction of 1.0 of second material 36, the reflection may be 0.04, or 4%. The percent reflection for each interface in a multilayer stack is additive such that seven layers of altering first and second materials 34 and 36 (see FIG. 7, for example) will provide fourteen interfaces 38 and a reflected light 42 that is at least a 50% reflection, and is approximately a 75% reflection of source light 40a (see FIG. 4) impinging thereon. Twelve layers with twenty four interfaces 38 will provide reflected light 42 that is approximately a 96% reflection of source light 40a impinging thereon and twenty layers may provide a 99% reflection. In contrast, on second side surface 30 of surface features 20, where there may be substantially no interface 38 because there is little or no first material 34 and because each layer on the second side may have a similar index of refraction to its adjacent layers, substantially all light 40b (see FIG. 4) traveling to second side surface 30 of surface features 20, may be absorbed by base 18 as absorbed light 44.

First and second materials 34 and 36 may not be metal layers but may be a non-conductive material, such as a dielectric material For example, aluminum by itself may not be utilized, nor may a metal sputtering process. Instead, it may be desirable that the first and second materials 34 and 36 are clear or transparent materials that may be deposited by inkjet, spray, reactive sputtering deposition, evaporation deposition, or similar deposition methods. The first and/or second materials 34 and 36 may also have a large index of refraction to enhance the reflectivity in that direction. In example embodiments, first material 34 and/or second material 36 may be chosen from the group including: zinc sulfide with an index of refraction of 2.32; titanium oxide with a index of refraction of 2.4; BiOCl with an index of refraction of 2.15; Sb2O5 with an index of refraction of 1.67; TiO2-ZrO2-SnO2 with an index of refraction in a range of 1.85 to 1.90 depending on the particular manufacturer; and ZnO2-Sb2O5 with an index of refraction of 1.7. Standard index matching fluids may be utilized and may have an index of refraction of approximately 1.5. The use of alternating first and second materials, or third, fourth, fifth, etc, materials, on only a first side 28 of surface features 20 of a base 18, wherein the interfaces provide reflective interfaces similar to 38, provides a highly reflective optical device for source light 40a (see FIG. 4) impinging on first side 28 of surface features 20. In contrast, light 40b (see FIG. 4) impinging on second side 30 of surface features 20 of base 18 will not encounter reflective interfaces 38 and, therefore, the light will not be reflected and will be absorbed by base coating 48 or base 18 (if base coating 48 is transparent). In one embodiment, base coating 48 and base 18 may be manufactured of the same material.

FIG. 3 shows a cross-section of an optical device 10 including a base 18 including surface features 20 having a first side surface 28 and a second side surface 30. A first material 34 is deposited over an entirety of base 18 thereby coating first and second side surfaces 28 and 30. Thereafter, a second material 36 is deposited substantially only on first side surfaces 28 so that an interface 38 between first and second materials 34 and 36 is present substantially only on first side surfaces 28. Accordingly, light impinging on first side surfaces 28 will be at least partially reflected and light impinging on second side surface 30 will not be reflected and will be absorbed by base 18.

Still referring to FIG. 3, each of first and second materials 34 and 36 may be deposited having a particular thickness 34a and 36a, respectively, to "tune" the optical device. The term "tune" may be defined as depositing a layer of material having a thickness chosen to enhance the optical properties of the device. For example, one may chose the thickness 34a and 36a of each of the layers of first and second materials 34 and 36, respectively, to enhance and increase the overall reflective properties of device 10 for projection light 40a (see FIG. 4). For example, we can tune the thickness of layers 34a and 36a to have high reflectance in the visible radiation range and a low reflectance in the UV and IR radiation ranges. This may enhance and increase the overall absorptive properties of device 10 for non-projection light 40b (see FIG. 4).

FIG. 4 shows a cross-section of an optical device 10 including a base 18 having a smooth top surface 46. Top surface 46 of base 18 has a coating 48 thereon which defines surface features 20 having a first side surface 28 and a second side surface 30. In this embodiment, the first and second side surfaces 28 and 30 are in a different orientation than the embodiment shown in FIGS. 2 and 3. In such an embodiment, coating 48 and base 18 may be referred to collectively as the base or support of multiple layers of first and second materials 34 and 36. In this embodiment, first material 34 is deposited substantially only on first side surfaces 28. Thereafter, second material 36 is deposited over an entirety of base 18 thereby coating first and second side surfaces 28 and 30 of surface features 20 so that interface 38 between first and second materials 34 and 36 is present substantially only on first side surfaces 28. In such an embodiment, second material 36 may have an index of refraction that matches an index of refraction of coating 48 applied directly on top surface 46 of base 18 so that an interface 49 between coating 48 and second material 36 does not define a reflective interface 38. Accordingly, light 40a impinging on first side surfaces 28 will be at least partially reflected as reflected light 42 and light 40b impinging on second side surface 30 will not be reflected and will be absorbed as absorbed light 44 by base 18.

During use of optical device 10, light 40a may be an imaging light projected from a first direction 40c wherein it may be desirable for such light to be reflected. For example, light 40a may be one or more imaging, projection light(s) projected by a projector 50. Light 40b may be ambient or room light originating from another direction 40d from a source 52 wherein it may not be desirable for such light to be reflected. For example, light 40b may be light from non-projection sources, such as room lamps, LED displays, and direct or reflected sunlight. These non-projection sources of light 40b, if reflected by optical device 10, may reduce the brightness of a light image projected by optical device 10 or may be viewed by a viewer (not shown). Accordingly, the present specification discloses an optical device 10 that selectively absorbs light from one direction and selectively reflects light from a second direction.

In other embodiments, there may be several different desirable projection lights 40a1, 40a2, etc., each projected to device 10 from a different direction, and there may be several different undesirable lights 40b1, 40b2, etc., each originating from still another, different direction, wherein device 10 may reflect the desirable projection lights 40a1, 40a2, etc., and may be tuned to absorb the undesirable lights 40b1, 40b2, etc. Accordingly, for example, surface features 20 may be a three dimensional projection including four different sides (such as front, back, left side, and right side) (not shown). The four different sides of surface features 20 may be coated as desired to include a first side to reflect a first light 40a1, a second side to absorb a second light 40b1, a third side to reflect a third light 40a2, and a fourth side to absorb a fourth light 40b2.

FIG. 5 shows a cross-section of an optical device 10 including a base 18 having a texture 54 on a top surface 46. Texture 54 may include a pattern of repeating surface features 20 each having a first side surface 28 and a second side surface 30. In this embodiment, first material 34 is deposited substantially only on first side surfaces 28. Thereafter, second material 36 is deposited over an entirety of base 18 thereby coating first and second side surfaces 28 and 30 of surface features 20 so that interface 38 between first and second materials 34 and 36 is present substantially only on first side surfaces 28.

FIG. 6 shows a cross-section of an optical device 10 including a base 18 having depressions 56 on a top surface 46. Depressions 56 may each have a first side surface 28 and a second side surface 30. In this embodiment, first material 34 is deposited substantially only on first side surfaces 28. Thereafter, second material 36 is deposited over an entirety of base 18 thereby coating first and second side surfaces 28 and 30 of surface features 20 so that interface 38 between first and second materials 34 and 36 is present substantially only on first side surfaces 28.

FIG. 7 shows a cross-section of an optical device 10 including a base 18 having surface features 20, each having a first side surface 28 and a second side surface 30. In this embodiment, a first layer of first material 34 is deposited substantially only on first side surfaces 28. Thereafter, a layer of second material 36 is deposited over an entirety of base 18 thereby coating first and second side surfaces 28 and 30 of surface features 20 so that interface 38 between first and second materials 34 and 36 is present substantially only on first side surfaces 28. This process is repeated four more times so that five layers of first material 34 are deposited on first side surfaces 28 and five layers of second material 36 are deposited on surface features 20 of optical device 10 in an alternating fashion. This will result in an interface 38 between each of the first and second materials 34 and 36 on first sides 28 of surface features 20, thereby increasing the reflectance of the layer stack on base 18 at first sides 28.

In contrast, multiple layers of substantially only second material 36 are coated on second sides 30 of surface features 20. The interface 58 between each of the multiple layers of second material 36 on second side 30 may not be a reflective interface because the index of refraction for the second material is the same for each layer on second side 30 of surface features 20. Accordingly, light 40b (see FIG. 4) impinging on second side surfaces 30 will substantially be transmitted by the layers of second material 36 and will be absorbed by base 18.

Figure 8:
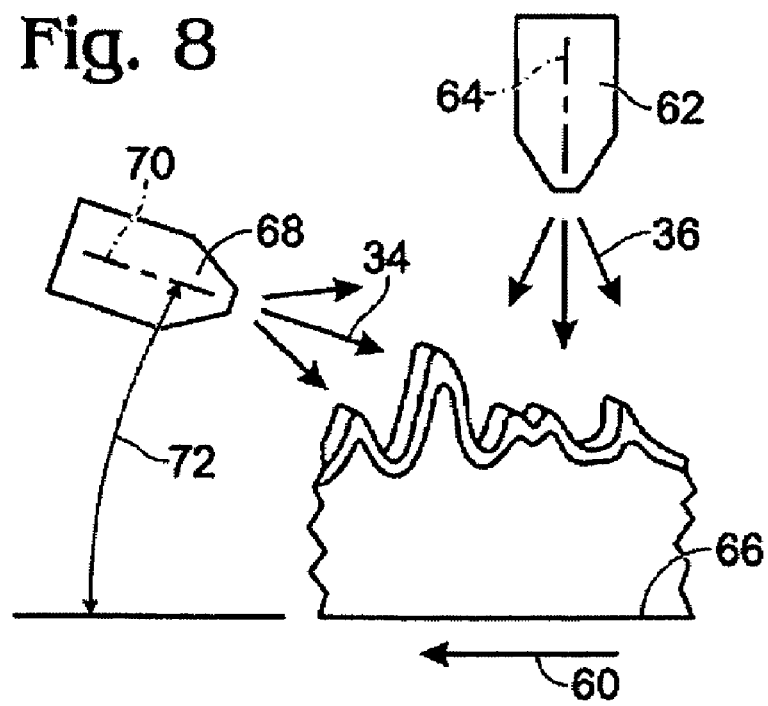
FIG. 8 is a cross-sectional side view of an optical device showing one example method of manufacturing one embodiment of the optical device.

FIG. 8 shows one example method of making optical device 10. In this embodiment, base 18 is moved in a direction 60 under a first spray nozzle 62 which may spray base 18, including surface features 20, with second transparent material 36. Second material 36 may be a non-conductive material, namely, a dielectric material, for example. In one example, a spray axis 64 of first spray nozzle 62 may be positioned approximately perpendicular to a plane 66 (shown in side view) of base 18 and approximately perpendicular to the direction of movement 60 of base 18. Any position of spray nozzle 62 may be utilized, and may be displaced from a perpendicular position, so as long as the coverage of the spray nozzle 62 results in an even coverage across surface features 20. Accordingly, such positioning of spray nozzle 62 with respect to base 18 may allow first and second sides 28 and 30 of surface features 20 to be substantially evenly coated with second material 36.

Thereafter, base 18 may be moved in direction 60, for example, under a second spray nozzle 68 which may spray base 18, including surface features 20, with first transparent material 34. In other embodiments, base 18 may be moved in a different direction than direction 60 for spraying by second spray nozzle 68. In still other embodiments, the spray nozzle may be moved.

A spray axis 70 of first spray nozzle 62 may be positioned at a low angle 72 with respect to plane 66 (shown in side view) of base 18 and at a low angle with respect to the direction of movement 60 of base 18. A low angle may be defined as an acute angle, and in some embodiments, may be an angle less than forty five degrees, with respect to plane 66 and direction of movement 60. In the example embodiment shown, low angle 72 may be approximately fifteen degrees or less. This low angle positioning of spray nozzle 68 with respect to base 18 may allow substantially only first side 28 of surface features 20 to be substantially evenly coated with first material 34 because surface features 20 may substantially block first material 34 from coating second sides 30 of the surface features.

In another embodiment, second spray nozzle 68, or similar positioning thereof of another spray nozzle, may be utilized for depositing both first and second materials 34 and 36 such that each of the first and second materials are deposited substantially only on first sides of surface features 20, as shown in the embodiment of FIG. 2.

In another embodiment, the last layer applied may be a transparent sealant or a protective coating to protect the underlying layers.

Other variations and modifications of the concepts described herein may be utilized and fall within the scope of the claims below.

We claim:

1. An optical device, comprising:
   a base including a plurality of surface features each including a first side and a second side;
   a first transparent layer deposited substantially only on said first side of said base surface features, said first layer having a first index of refraction; and
   a second transparent layer deposited on said first transparent layer and having a second index of refraction different than said first index of refraction, wherein said material on said first side of said surface features defines a reflective surface and wherein said material on said second side of said surface features defines a light transmissive surface.

2. The device of claim 1 wherein said base comprises a textured material.

3. The device of claim 1 wherein said surface features are chosen from at least one of the group consisting of protrusions and depressions.

4. The device of claim 1 wherein said first and second layers are each manufactured of a non-metallic dielectric material.

5. An optical device, comprising:
   a base including a plurality of surface features each including a first side and a second side;
   a first transparent layer deposited substantially only on said first side of said base surface features, said first layer having a first index of refraction; and
   a second transparent layer deposited on said first transparent layer and having a second index of refraction different than said first index of refraction: and
   a transparent base layer deposited directly on said base such that said transparent base defines a plurality of surface features each corresponding to said surface features of said base, said transparent base layer having said second index of refraction and, said first transparent layer deposited substantially only on a first side of said plurality of said surface features of said transparent base layer.

6. An optical device, comprising:
   a base including a plurality of surface features each including a first side and a second side;
   a first transparent layer deposited substantially only on said first side of said base surface features, said first layer having a first index of refraction; and a second transparent layer deposited on said first transparent layer and having a second index of refraction different than said first index of refraction; and a third transparent layer deposited substantially only on a first side of said surface features of said second transparent layer, said third transparent layer having said first index of refraction; and a fourth transparent layer deposited on said third transparent layer and having said second index of refraction.

7. An optical device, comprising:

a base including a plurality of surface features each including a first side and a second side;

a first transparent layer deposited substantially only on said first side of said base surface features, said first layer having a first index of refraction; and a second transparent layer deposited on said first transparent layer and having a second index of refraction different than said first index of refraction, wherein said second layer is deposited substantially only on said first side of said base surface features.

8. An optical device, comprising:

a base including a plurality of surface features each including a first side and a second side;

a first transparent layer deposited substantially only on said first side of said base surface features, said first layer having a first index of refraction; and a second transparent layer deposited on said first transparent layer and having a second index of refraction different than said first index of refraction, wherein said first layer defines a first thickness and said second layer defines a second thickness different from said first thickness, and wherein a thickness of each layer is chosen to tune optical properties of said device.

* * * * *

UNITED STATES PATENT AND TRADEMARK OFFICE
CERTIFICATE OF CORRECTION

| | |
|---|---|
| PATENT NO. | : 7,696,589 B2 |
| APPLICATION NO. | : 12/351134 |
| DATED | : April 13, 2010 |
| INVENTOR(S) | : Gregory J. May et al. |

Page 1 of 1

It is certified that error appears in the above-identified patent and that said Letters Patent is hereby corrected as shown below:

In column 6, line 53, in Claim 5, delete "refraction:" and insert -- refraction; --, therefor.

Signed and Sealed this

Sixth Day of July, 2010

David J. Kappos
*Director of the United States Patent and Trademark Office*